United States Patent [19]

Langstone

[11] Patent Number: 5,216,828
[45] Date of Patent: Jun. 8, 1993

[54] FISHING TACKLE RETRIEVAL SYSTEM

[76] Inventor: Thomas L. Langstone, 707 E. Maryland Ave., St. Paul, Minn. 55106

[21] Appl. No.: 906,227

[22] Filed: Jun. 26, 1992

[51] Int. Cl.5 .............................................. A01K 97/00
[52] U.S. Cl. ................................................... 43/17.2
[58] Field of Search ...................... 43/4, 5, 53.5, 17.2

[56] References Cited

U.S. PATENT DOCUMENTS

| | | | |
|---|---|---|---|
| 2,950,558 | 8/1960 | Karpes | 43/17.2 |
| 3,150,460 | 9/1964 | Dees | 43/4 |
| 3,693,280 | 9/1972 | Calhoun | 43/17.2 |
| 3,802,111 | 4/1974 | Manning et al. | 43/17.2 |
| 4,004,539 | 1/1977 | Wesson | 43/5 |
| 4,086,718 | 5/1978 | Swanson et al. | 43/17.2 |
| 4,622,772 | 11/1986 | Cawley et al. | 43/17.2 |
| 5,076,002 | 12/1991 | Kelly | 43/17.2 |

*Primary Examiner*—Richard K. Seidel
*Assistant Examiner*—Jeanne M. Elpel

[57] ABSTRACT

A retrieving device comprising a base pole with a handle to which length extensions may be mounted. A top attachment which can be mounted, for retrieval of tackle from trees, and above water obstacles having a cusp section with two longitudinal shafts which bend perpendicularly having angular grooves on the inside and outside for securing fishing line during retrieval and a back attachment for securing hooks.

1 Claim, 5 Drawing Sheets

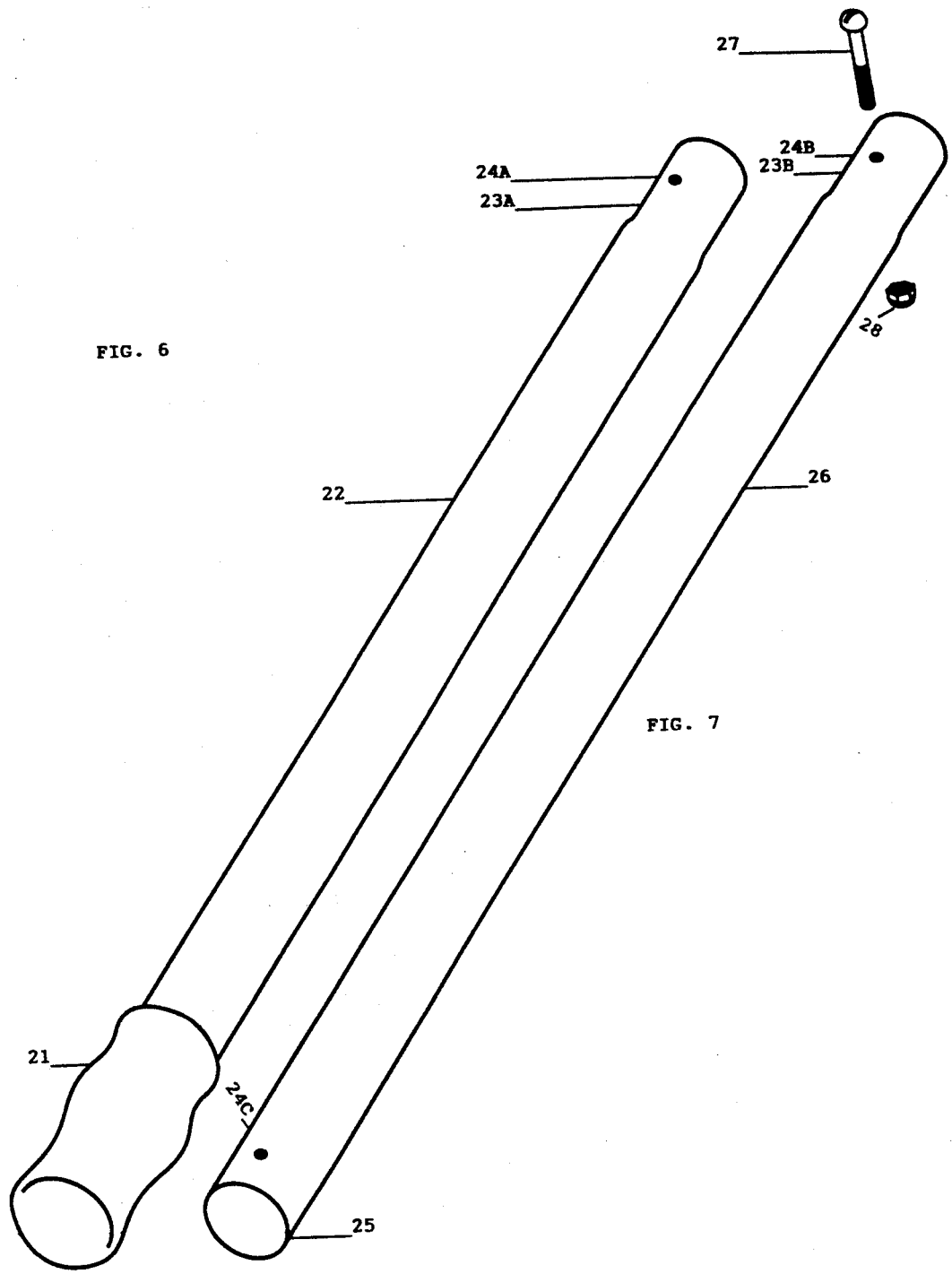

FISHING TACKLE RETRIEVAL SYSTEM

BACKGROUND

1. Field Of Invention

The present invention relates to the sport of fishing and more particularly to a device adapted for extricating and retrieving lures and other tackle from shoreline and obstacles.

2. Prior Art

Many, if not most fisherman have lost lures, floats and other fishing tackle because it became tangled in tree limbs or during casting or retracting.

Heretofore no device has been proposed of implemented for retrieving said lost tackle, resulting in it remaining tangled and consequently abandoned in trees and other obstacles.

Most users, therefore, would find it desirable to have a device which would extricate tackle from obstacles on which it has become tangled of lodged.

BRIEF DISCLOSURE OF THE INVENTION

The preferred embodiment of the present invention has a base section with a handle at the bottom and an internally threaded flange at its top. Assemblable to this unit are a number of extension poles which have internally threaded flanges at the tops and externally threaded flanges at the bottoms. Mountable to the top of the extension pole is an attachment. The attachment with an externally threaded flange at its base and a cusp section on its top consisting of two shafts, provided with angular grooves on their inner and outer sides, and flat points at their tips. A screen covered pad attachment is affixed to the back of the cusp section.

An object of this invention is to provide a device for easily dislodging and retrieving fishing lures and other tackle from tree limbs and other shoreline obstacles on which they have become lodged.

An object of this invention is to provide such a device which can be adjusted for varying heights as needed.

Readers will find further objects and advantages of the invention from a consideration of the ensuing description and the accompanying drawings.

BRIEF DESCRIPTION OF DRAWINGS

FIGS. 6 and 7 are top perspective views of an alternative base pole and extension pole assembly using a nut and bolt means of securing.

Figure 1:
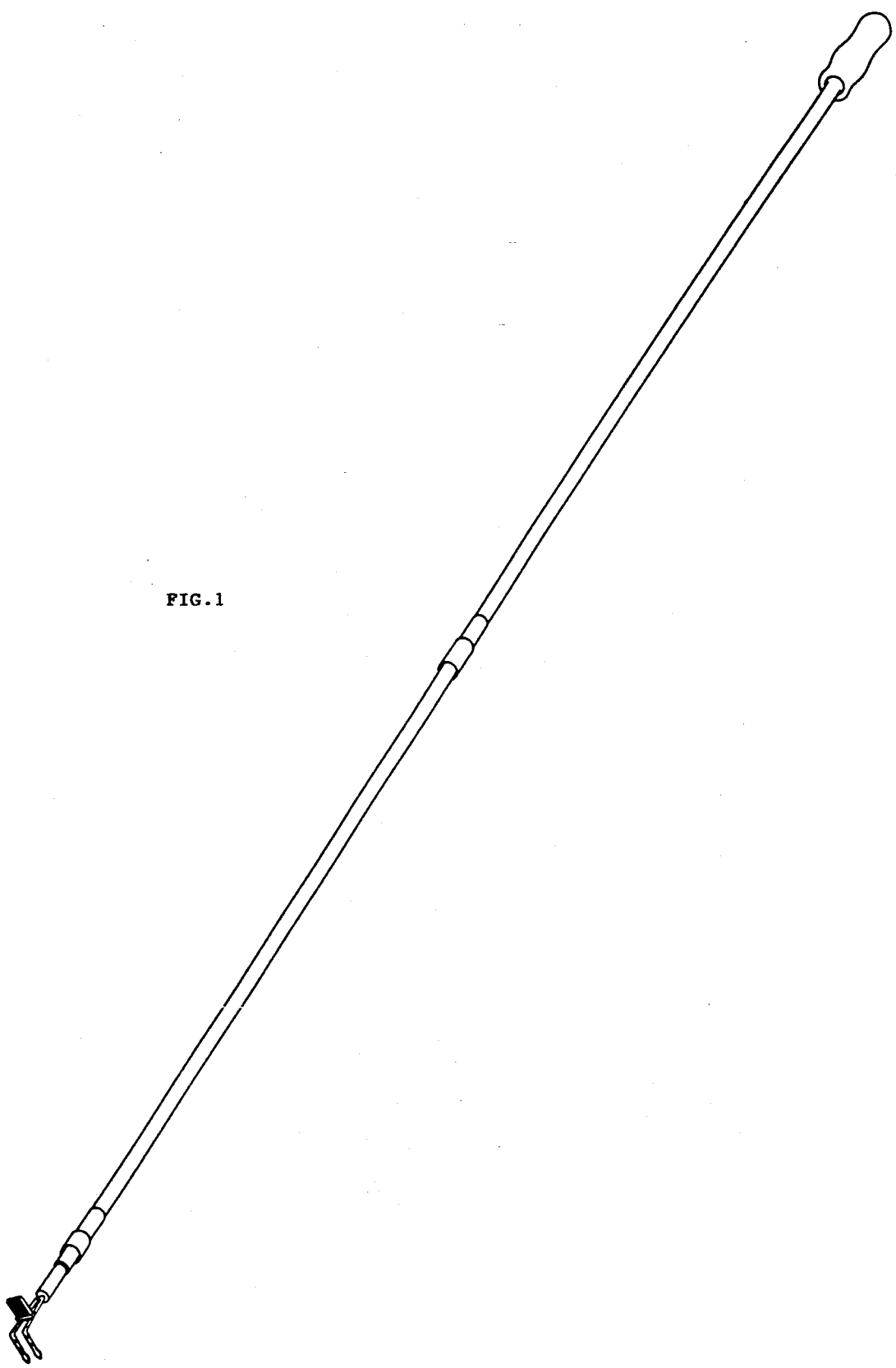
FIG. 1 is a perspective view showing a preferred embodiment of the assembled device.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DRAWING REFERENCE NUMERALS

1—Handle
2—Base pole
3a—Internally threaded extension connecter flange
3b—Internally threaded attachment/extension connecter flange
4—Externally threaded extension connecter flange
5—Extension pole
6—Externally threaded attachment connecter flange
7—Stem
8a—Vertical shaft
8b—Vertical shaft
9a—Horizontal shaft
9b—Horizontal shaft
10a—Flat point
10b—Flat point
11a—Angular grooves on outside of horizontal shaft
11b—Angular grooves on inside of horizontal shaft
12—Pad covered with screen
13—Pad retainer
14—Bolt
15—Plate
16—Capped nut
21—Handle
22—Base pole
23a—Tapered end
23b—Tapered end
24a—Hole
24b—Hole
24c—Hole
25—Hollow base
26 Extension pole
27 Attachment bolt
28 Attachment nut
29—Hollow based attachment connecter flange
30—Hole
33—Handle
34—Base pole
35a—Telescoping extension
35b—Telescoping extension
35c—Telescoping extension
35d—Telescoping extension
35e—Telescoping extension
36—Internally threaded attachment connecter flange

DETAILED DESCRIPTION

FIG. 1 shows a perspective view of the assembled fishing tackle retrieving device with a single extension section according to the preferred embodiment of the invention. The invention utilizes a plurality of elongated extension members of equal length, which may be attached as required.

Figures 2, 3:
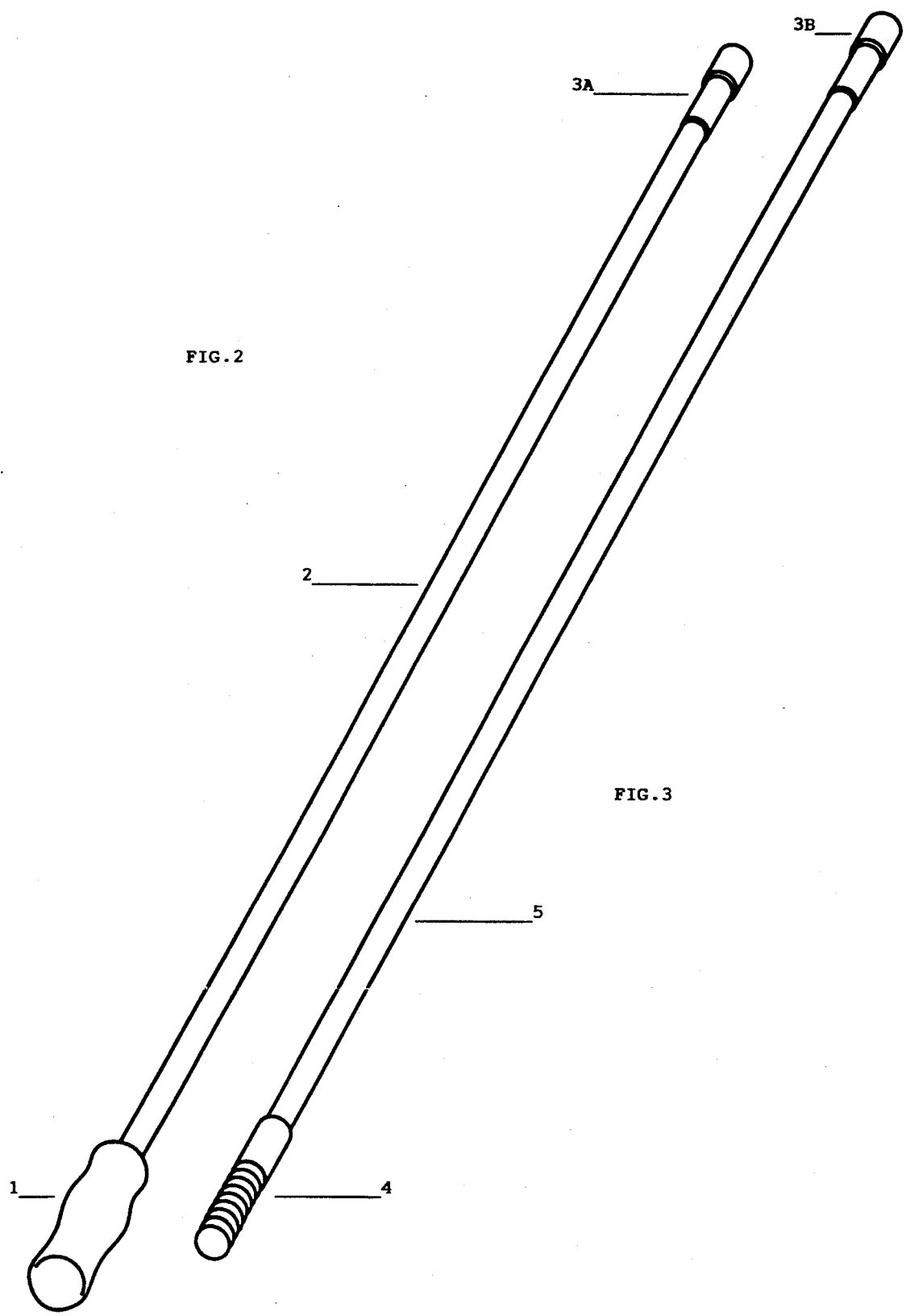
FIGS. 2 and 3 are a perspective view showing a preferred embodiment of the base pole and an extension pole section.

In FIGS. 2 and 3 a disassembled view of the base section and an extension section are illustrated. The base section comprising a pole 2 manufactured from a durable, rigid material with a handle 1 at its base and an internally threaded flange 3a at its top. The extension section also manufactured from a durable, rigid material has an externally threaded flange 4 at the base and an internally threaded flange 3b at the top to which other extension poles, which are provided, or retrieval attachments may be mounted by screwing the components together.

Figure 4:
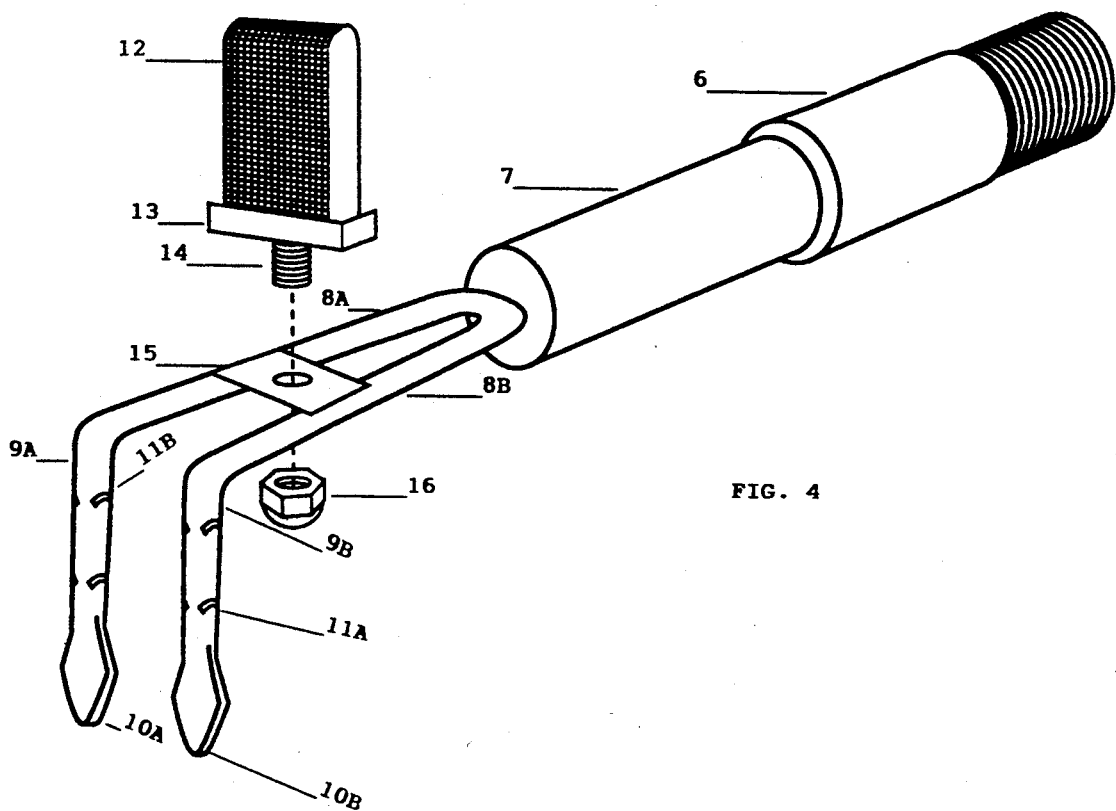
FIGS. 4 and 5 are top perspective views of the cusp attachment with a suspended view of the back attachment including an alternative base attachment design.

In FIG. 4 the cusp attachment designed for retrieving lures and other tackle from trees and other shoreline obstacles is illustrated. This preferred embodiment has a stem 7 at the base of which is an externally threaded attachment connecter flange 6 and at the top two longitudinal shafts 8a, 8b which bend perpendicular 9a, 9b and come to flat points 10a, 10b. These points are designed to rake free fishing tackle which is tangled in tree branches. The perpendicular shafts also have angular grooves on their inside and outside sections 11a, 11b for securing fishing line during tackle retrieval. A back attachment is mounted in the center of the back of the longitudinal shafts 8a, 8b. Its purpose is to secure and retain during retrieval lures and hooked tackle which are caught and lodged in its structure so that they will not fall into the water during retrieval once the fishing line on which they are tied is freed from the tree or other obstacle on which it has become tangled. The back attachment comprising a pad covered with screen 12, a pad retainer 13 preferably made of metal with a bolt protruding from its base which passes through a plate 15 and is mounted on the back of the longitudinal shafts by means of a capped nut 16.

FIGS. 6 and 7 illustrate an alternative base and extension pole assembly. In this alternative embodiment the base pole 22 has a handle 21 at the bottom and the top is tapered at the end 23a, with a hole drilled completely through both sides 24a. The extension section 26 has a hole drilled completely through the side near its base, and a base which is hollow 25 through which the tapered top of the base pole 23a or another extension pole can be inserted and the pieces joined by passing a bolt 27 through the holes in the joined members and secured with a nut 28. At the top of the extension poles is a tapered end 23b with a hole in its side which extends completely through to the other side of the pole. Other extension pole sections or retrieval attachments may be mounted on the top and secured with a bolt 27 and nut 28 as previously explained, supra.

Figure 5:
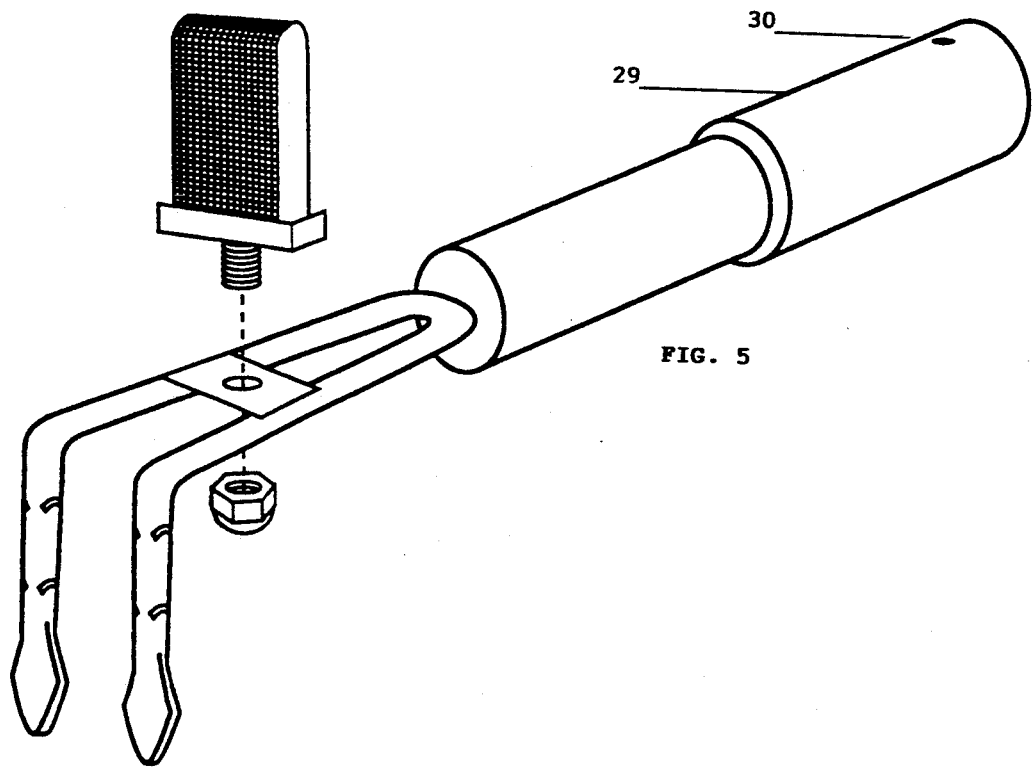

FIGS. 5 illustrates an attachment designed for mounting by means of the bolt and nut assembly. In this alternative the cusp attachment has a hollow base attachment connecter flange 29 through which a hole is drilled 30 providing a means for attaching it to the end of an extension pole whose tapered end has been inserted into the base of said attachment and a bolt 27 passed through the holes in the joined sections, and secured by means of a nut 28.

Figure 8:
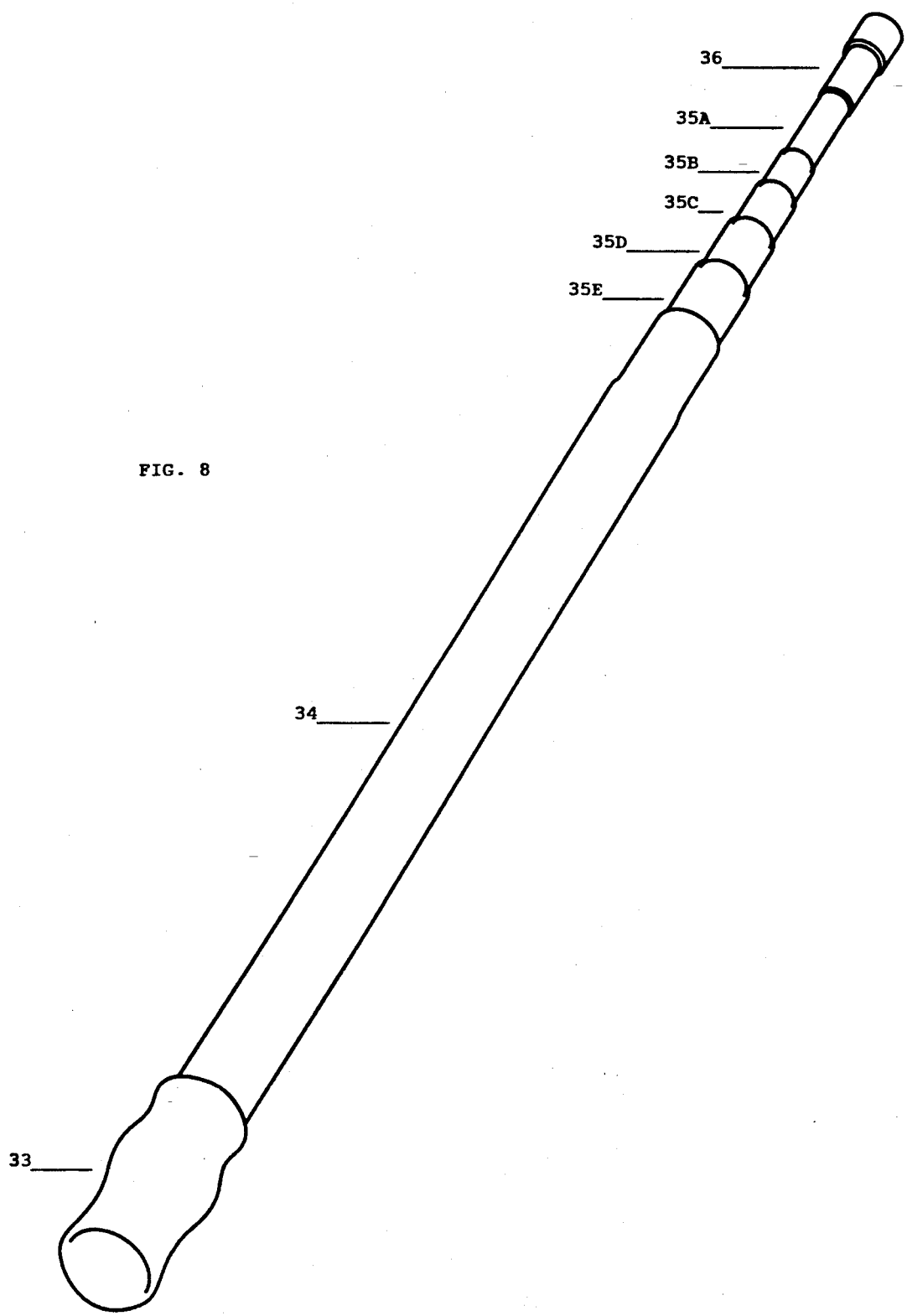
FIG. 8 is a perspective view of an alternative base and extension section assembly using a telescoping tube assembly.

FIG. 8 illustrates an alternative embodiment of the invention using a telescoping pole designed to slide inward and outward to extend or contract the device by means of a plurality of tubular sections which overlap. The pole in this rendering is in the retracted position. The pole consists of six tubular sections 34, 35a, 35b, 35c, 35d and 35e. These six sections telescope one at a time with section 35a sliding out of section 35b then these two out of section 35c and all three out of section 35d then all four out of section 35e, and finally all five out of the base pole section 34. The base pole in this illustration having a handle 33 at the bottom. An internally threaded attachment connecter flange 36 is located at the top of tubular section 35a, to which the retrieval attachment (FIGS. 4) may be mounted which is equipped with externally threaded connecter flange 6.

FISHING TACKLE RETRIEVER OPERATION

The retrieving device of FIG. 1 will perform a number of retrieving functions.

To retrieve a fishing lure, float, etc. from an obstacle such as a tree branch on which it has become tangled the user must screw a number of extensions, which are provided, into the top of the base pole section of the device (FIGS. 1 and 2) until the necessary height is determined. The user then mounts the cusp attachment (FIG. 4) by screwing it into the end of the final extension flange. The assembled unit is then raised by the base pole to reach the item of tackle which has become tangled on the tree branch. If the hooks of a lure are tangled in a tree branch the flat points at the end of the cusp section may be used to rake the hooks free from the branch. Once the hooks are loose from the branch and the lure is hanging by its line from the branch, the back attachment (FIG. 4) 12-16 with its pad covered with screen is employed to secure the hooks into the pad, thus preventing the lure from falling into the pond of water during retrieval and becoming lost. Once the lure's hooks have become solidly planted in the pad the cusp section of the attachment may be once again used. The fishing line hanging from the branch and attached to the lure may be wound around the two appendages of the cusp section with a turning motion of the pole assembly and the line will stay wound around the cusp appendage through utilization of the grooves on the inside and outside of the appendages 11a, 11b. The retriever pole unit may be tugged causing the fishing line to break or dislodge from the obstacle, or the cusp section appendages 8a-9b may be placed around the tree branch, and the branch snapped and broken with a turn of the retriever pole unit at its base. Thus causing the lure to become removed from the obstacle upon which it has become tangled. In instances where a float is attached to the tackle being retrieved it is not necessary to employ the back unit pad to secure the subject hooks, since if a line with a float should fall into the water it would be easily retrieved with the cusp section of the unit. Float retrieval from obstacles such as tree limbs is a simple process due to the configuration of the cusp section of the device. For float extraction, the user merely needs to place the lateral appendages of the cusp section 9a, 9b around the line above the tangled float and rest the appendages on the top of the float. With a twisting motion of the retriever pole unit the fishing line on which the float is attached will become lodged in the angular grooves on the outside of the appendages 11a, 11b, and the float may be retrieved after tugging of the retriever pole unit causes a breaking of the tangled fishing line.

An alternative means for mounting extension poles and attachments is illustrated in FIGS. 6, 7, 5. In this design the appendages are mounted atop each other by placing the tapered end of a bottom section into the hollow base of an upper extension or attachment and securing them by placing a bolt 27 through the holes drilled through the sides of their bases and tops, and securing them with a nut 28. Retrieval of lures and other tackle is then accomplished as previously explained above.

A third alternative retriever pole assembly is illustrated in FIG. 8. In this embodiment a telescoping device is utilized. Users can employ this device to retrieve fishing lures and tackle in the same manner as they can use the device in FIG. 1. The difference in operation is the manner of attaining the desired height to reach the lure or tackle sought to be retrieved. In this instance the user first mounts the attachment on to the top section of the telescopic pole (FIGS. 4) by screwing the externally threaded attachment connecter flange 36 on the base of the attachment into the internally threaded attachment connecter flange 36 at the top of the last extension of the telescopic pole 35a. Then, pulling the top pole section from within the below sections until the desired height is reached. The device is then manipulated as explained previously, supra, to retrieve lost lures and other tackle. To retract the telescoping poles the operator may retract each tubular section by pushing it and causing it to slide into the portion of tubular section below it until all sections ar compressed into the base pole section for storage.

CONCLUSION, RAMIFICATIONS AND SCOPE OF INVENTION

Thus, the reader will see that the lure and tackle retriever of the invention provided a highly reliable, adjustable device which can be used by persons of almost any age to retrieve and prevent the loss of costly fishing lures and other tackle. The device will also improve the environment by encouraging users to collect lost and abandoned tackle from ponds and trees where they are a hazard to birds, other wildlife, and human beings as well, and will reduce the hazards posed by lost and abandoned lures and other tackle rusting and base paints deteriorating polluting the ground and waterways.

While certain preferred embodiments of the present invention have been disclosed in detail, it is to be understood that various modifications in its structure may be adopted without departing from the spirit of the invention or the scope of the following claims.

I claim:

1. A fishing lure and tackle retriever, comprising:
a linearly extendable pole; and
a cusp attachment having a longitudinal stem with two longitudinal shafts protruding from the top of said stem which bend perpendicularly towards a cusp attachment frontside and taper to flat points with said perpendicular shafts having angular grooves on the inside and outside of said shafts; and
means for securing said cusp attachment to one end of said pole so that said cusp attachment extends from said one end of said pole; and
a back attachment mounted perpendicularly on a cusp attachment, said back attachment backside having a pad covered with screen; and
means for securing said back attachment to the backside of said cusp attachment.

* * * * *